US009880822B2

(12) United States Patent
Vaidya et al.

(10) Patent No.: US 9,880,822 B2
(45) Date of Patent: *Jan. 30, 2018

(54) METHOD AND SYSTEM FOR PARALLELIZATION OF SEQUENTIAL COMPUTER PROGRAM CODES

(71) Applicant: KPIT Technologies Limited, Pune (IN)

(72) Inventors: Vinay Govind Vaidya, Pune (IN); Ranadive Priti, Pune (IN); Sah Sudhakar, Pune (IN)

(73) Assignee: KPIT TECHNOLOGIES LIMITED, Pune (IN)

( * ) Notice: Subject to any disclaimer, the term of this patent is extended or adjusted under 35 U.S.C. 154(b) by 367 days.

This patent is subject to a terminal disclaimer.

(21) Appl. No.: 14/606,924

(22) Filed: Jan. 27, 2015

(65) Prior Publication Data
US 2015/0317140 A1 Nov. 5, 2015

Related U.S. Application Data

(63) Continuation of application No. 13/132,189, filed as application No. PCT/IN2009/000697 on Dec. 1, 2009, now Pat. No. 8,949,786.

(30) Foreign Application Priority Data

Dec. 1, 2008 (IN) .......................... 2513/MUM/2008

(51) Int. Cl.
*G06F 9/44* (2006.01)
*G06F 9/45* (2006.01)

(52) U.S. Cl.
CPC .............. *G06F 8/456* (2013.01); *G06F 8/314* (2013.01)

(58) Field of Classification Search
None
See application file for complete search history.

(56) References Cited

U.S. PATENT DOCUMENTS 5,347,647 A * 9/1994 Allt ...................... G06F 11/3409
702/186
6,094,715 A * 7/2000 Wilkinson .............. G06F 7/483
712/20

(Continued)

FOREIGN PATENT DOCUMENTS

DE 10200505056186 7/2010

OTHER PUBLICATIONS

T.Moseley, D.Grunwald, D.A. Connors, R.Ramanujam, V.Tovinkere, and R.Peri. LoopProf:Dynamic Techniques for Loop Detection and Profiling. In Proceedings of the 2006 Workshop on Binary Instrumentation and Applications (WBIA), 2006.

(Continued)

*Primary Examiner* — Isaac T Tecklu
(74) *Attorney, Agent, or Firm* — Foley & Lardner LLP

(57) ABSTRACT

Systems and methods for use in parallelization of computer program code are provided. One method includes determining line dependency data indicating a dependency of a plurality of lines of the sequential computer program code. The method further includes determining time data indicating a time required for the execution of a plurality of functions of the sequential computer program code and determining parallelizability of the sequential computer program code using the line dependency data and the time data. The method further includes generating parallel executable computer program code by inserting program instructions in the sequential computer program code based on the determined parallelizability. The step of generating the parallel executable computer program code includes identifying and routing at least a portion of one or more of the plurality of functions to different processors to achieve parallelization of sequential computer program code using the line data and time dependency data.

20 Claims, 4 Drawing Sheets

(56) References Cited

U.S. PATENT DOCUMENTS

| | | | |
|---|---|---|---|
| 6,110,224 A * | 8/2000 | Kawabe | G06F 11/3604 714/E11.209 |
| 6,243,863 B1 | 6/2001 | Kothari et al. | |
| 6,253,371 B1 | 6/2001 | Iwasawa et al. | |
| 6,622,301 B1 | 9/2003 | Hirooka et al. | |
| 6,742,083 B1 | 5/2004 | Greicar | |
| 7,159,211 B2 | 1/2007 | Jalan et al. | |
| 7,730,460 B1 * | 6/2010 | Warren | G06F 11/323 717/130 |
| 7,983,890 B2 | 7/2011 | Bliss et al. | |
| 8,291,408 B1 * | 10/2012 | Czymontek | G06F 8/34 715/749 |
| 8,307,337 B2 * | 11/2012 | Chamieh | G06F 9/4428 717/113 |
| 8,438,552 B2 | 5/2013 | Dai et al. | |
| 8,656,347 B2 | 2/2014 | Ito | |
| 2001/0003187 A1 | 6/2001 | Aoki et al. | |
| 2001/0020293 A1 * | 9/2001 | Uchihira | G06F 8/30 717/128 |
| 2006/0123401 A1 | 6/2006 | O'Brien et al. | |
| 2006/0200796 A1 | 9/2006 | Ota et al. | |
| 2007/0011684 A1 | 1/2007 | Du et al. | |
| 2007/0079281 A1 | 4/2007 | Liao et al. | |
| 2007/0130568 A1 * | 6/2007 | Jung | G06F 8/456 718/104 |
| 2007/0192766 A1 | 8/2007 | Padalia et al. | |
| 2007/0226686 A1 | 9/2007 | Beardslee et al. | |
| 2007/0234326 A1 | 10/2007 | Kejariwal et al. | |
| 2007/0283337 A1 * | 12/2007 | Kasahara | G06F 8/456 717/149 |
| 2008/0098403 A1 | 4/2008 | Balakrishnan et al. | |
| 2009/0138862 A1 * | 5/2009 | Tanabe | G06F 8/456 717/149 |
| 2010/0031241 A1 * | 2/2010 | Schwartz | G06F 8/456 717/149 |
| 2013/0159892 A1 * | 6/2013 | Suraj | G06F 3/048 715/762 |

OTHER PUBLICATIONS

P.Young and M.Munro, A New View of Call-Graphs for Visualising Code Structure, Technical Report Mar. 1997, Centre for Software Maintenance, University of Durham, Jan. 1997.

"Google search results" (cited by Examiner in Parent U.S. Appl. No. 13/132,189 on Oct. 22, 2012) (2 pages).

"ip.com more-like-this search results" (cited by Examiner in Parent U.S. Appl. No. 13/132,189 on Oct. 22, 2012) (4 pages).

"ip.com text search results" (cited by Examiner in Parent U.S. Appl. No. 13/132,189 on Oct. 22, 2012) (4 pages).

* cited by examiner

METHOD AND SYSTEM FOR PARALLELIZATION OF SEQUENTIAL COMPUTER PROGRAM CODES

CROSS-REFERENCE TO RELATED PATENT APPLICATIONS

This application is a Continuation of U.S. patent application Ser. No. 13/132,189, filed Jun. 1, 2009 (now U.S. Pat. No. 8,949,786), which is a U.S. National Stage application that claims priority under 35 U.S.C. §371 to International Patent Application No. PCT/IN2009/000697, filed Dec. 1, 2009, which in turn claims priority to and the benefit of Indian Patent Application No. 2513/MUM/2008, filed Dec. 1, 2008. The disclosures of each of the aforementioned patent applications are incorporated by reference herein in their entireties.

FIELD OF THE INVENTION

The present invention in general relates to execution of sequential computer programs and more particularly, to a method and system for parallelization of sequential computer program codes for speeding execution of sequential computer programs.

BACKGROUND OF THE INVENTION

The past few decades have been witness to the development of computer systems and their adaptive utility in various domains. The rapid pace of advances in software development and more particularly, the coding schematics used for writing of such computer programs have necessitated increase in processing capacities of the hardware used for execution of these computer programs. There have been significant efforts on two fronts for achieving these objectives. One has been in the development of faster as well as task-specific processors and the other, in the area of re-architecture of computer code for faster execution on available processors.

Parallel computing as a method to enable faster processing of computer programs has been the focus of recent innovations in the art. This has paved the way for the use of multiple processors and of late, processors with multiple processing elements. In this context, the concepts of processor dusters as well as grids deserve mention and multi-processor computers which have multiple processing elements within the same machine.

Though concept of parallel computing seems advantageous and has seen rise in acceptability and popularity amongst software developers, a drawback with this concept becoming the mainstay of the field is that existing methods of programming are sequential and thus not directly suited to parallelising the code. Rewriting such program codes for parallel processing is generally tedious. In addition, identification and mapping of parallelizable portions of the code and intelligent scheduling to different processor elements, remote or otherwise, and also the communication during such processing are still major hurdles towards achieving optimal speed-up of actual execution of computer programs.

Use of multicore processors scores over use of multiple processors in achieving the high processing capacities without requirements of high clock cycles, heat generation and power input. However, with the rising popularity of multi-core processors the need for related tools is also increasing. Application developers are in need of tools that could ease the programming for multicore processors. On the other hand, there is also an increased need for tools and methods to parallelize existing computer programs to take optimal advantage of parallel hardware.

In this regard, various prior art literature have attempted parallel execution of sequential computer program code through various means such as: by performing control and data flow analysis to determine parallelizable conditions, determining parallelizable conditions based on class specific abstraction, by using specialized multiple processing units, by converting input source code into intermediate language and then executing task dependency, and by using directed acyclic graphs (DAGs) and post-wait control structures. Another method followed is by accessing data patterns and the profiling information to generate equivalent data access patterns to produce code to control first touch data.

However, there are drawbacks of the methods in the existing prior art such as, in most of the methods human intervention becomes mandatory and the methods concentrates only on the loop parallelization i.e. the part of code which is repeatedly executed. Further, changing the sequential code may temper the actual functionality and also the methods are applicable only to limited range of applications. Furthermore, few methods convert input source code into intermediate language for parallelization which is a tedious process.

Information relevant to attempts to address these problems can be found in U.S. Pat. No. 6,253,371, U.S. Pat. No. 6,243,863, DE 10200505056186, US 20010003187, US 20070234326, US 20070226686, U.S. Pat. No. 6,622,301 and U.S. Pat. No. 6,742,083. However, each one of these references suffers from one or more of the above listed drawbacks.

Therefore, there exists a need for an automated adaptation of legacy code, existing sequential code and new code written in a sequential manner for conversion into code for parallel execution and hence, achieving faster execution on parallel processors. Accordingly, the present invention describes a methods and a system working thereupon for reducing execution times of computer programs by enabling effective parallelization of computer program code thereof.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The primary object of the present invention is to describe a method and a system for enablement of parallel computing of sequential computer program code.

In one aspect, the present invention describes a method for parallelization of sequential computer program code for speeding the execution including steps of inputting the sequential computer program code to an automatic parallelization system; analysing the structure of the sequential computer program code to identify positions to insert special program instructions (SPI) in the sequential computer code without affecting functionality; profiling the sequential computer program code by preparing call graphs, chronometry and chronology of the functions or modules to determine dependency of each line of the sequential computer program code and the time required for the execution of each function or module of the sequential computer program code; determining parallelizability of the sequential computer program code from the information obtained by the analysing and profiling the sequential computer program code; inserting SPI to the sequential computer program code upon determination of parallelizability to obtain parallel executable computer program code; and passing the parallel executable computer program code to a parallel computing environment for execution.

In another aspect, the present invention describes an automatic parallelization system for parallelization of a sequential computer program code that includes a syntactic analyser to analyze the structure of the sequential computer program code to identify the positions to insert special program instructions (SPJ) in the sequential computer code; a profiler for profiling the sequential computer program code by preparing call graphs, chronometry and chronology of the functions or modules to determine dependency of each line of the sequential computer program code and the time required for the execution of each function or module of the sequential computer program code; an analyzer to determine parallelizability of the sequential computer program code from the information obtained by analysing and profiling of the sequential computer program code; and a code generator to insert SPI to the sequential computer program code upon determination of parallelizability to obtain parallel computer program code, which is further outputted to a parallel computing environment for execution.

Accordingly the present invention provides an iterative process for estimation of absolute minimum wait time (AMWT) for initiating execution of a particular function or part thereof within the sequential computer program code.

It is advantageous that the present invention provides for enablement of execution of functions or modules in the sequential computer program code ahead of their call time in comparison with typical sequential execution, thus increasing the execution speed of the sequential computer program code.

The systems and apparatuses disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION OF THE INVENTION

The embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art about making and/or using the invention. However, in certain instances, well-known or conventional details are not described in order not to unnecessarily obscure the present invention in detail.

The present invention describes a method and system for parallelizing computer program code. The sequential computer program codes include a plurality of functions or modules in a form of a source code for sequential execution. In one embodiment, the sequential computer program code is analyzed offline by executing the application at least once to determine the parallelizable code through the process of analyzing and profiling. Further, the sequential source code is modified to generate a new code by inserting Special Purpose Instructions (SPI) to run code or pieces thereof ahead of time to achieve efficient usage of available parallelization hardware and to reduce the total time required for execution of the application. The phrases 'computer program code', 'source code', 'code', 'sequential computer program code' are used interchangeably unless specified throughout the document. It would be clear to a person of ordinary skill in the art that the current invention is applicable to any parallel computing system and computer program code.

Figure 1:
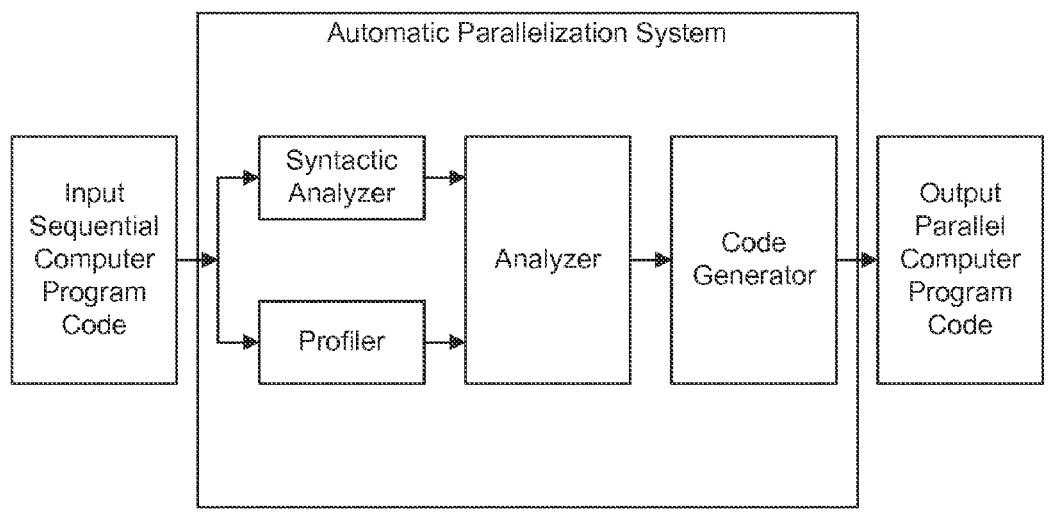
FIG. 1 is a block diagram illustrating an automatic parallelization system, in accordance with the principles of the present invention.

FIG. 1 is a block diagram illustrating an automatic parallelization system, in accordance with the principles of the present invention. Particularly, the automatic parallelization system includes a syntactic analyser, a profiler, an analyser and a code generator which are coupled as shown in FIG. 1.

In another embodiment, the syntactic analyser analyzes the structure of the sequential computer program code to identify the positions to insert SPI in the sequential computer program code. The profiler analyzes the sequential computer program code by preparing call graphs, chronometry and chronology of the functions or modules to determine dependency of each line of the sequential computer program code and the time required for the execution of each function of the sequential computer program code. Further, the analyzer determines parallelizability of the sequential computer program code from the information obtained by analysing and profiling of the sequential computer program code and the code generator inserts SPI in the sequential computer program code upon determination of the parallelizability to obtain parallel computer program code, which is further outputted to a parallel computing environment for execution. In addition, the automatic parallelization system includes a memory associated with the parallel computing environment to store information obtained by the syntactic analyzer and the profiler for subsequent retrieval.

It is appreciated that the parallel computing environment includes a plurality of processors such as, but not restricted to multi core processors, symmetric processors, asymmetric processors, in proximate and/or remote configuration.

In operation, the method for parallelization of sequential computer program code includes inputting the sequential computer program code to an automatic parallelization system. Further, the structure of the inputted sequential computer program code is analysed by the syntactic analyser to identify the positions to insert special program instructions (SPI) to the sequential computer code without affecting its functionality. Simultaneously, the call graphs, chronometry and chronology of the functions or modules are generated in the sequential computer program code by the profiler to determine dependency of each line of the sequential computer program code and the time required for the execution of each function of the sequential computer program code.

Figure 2:
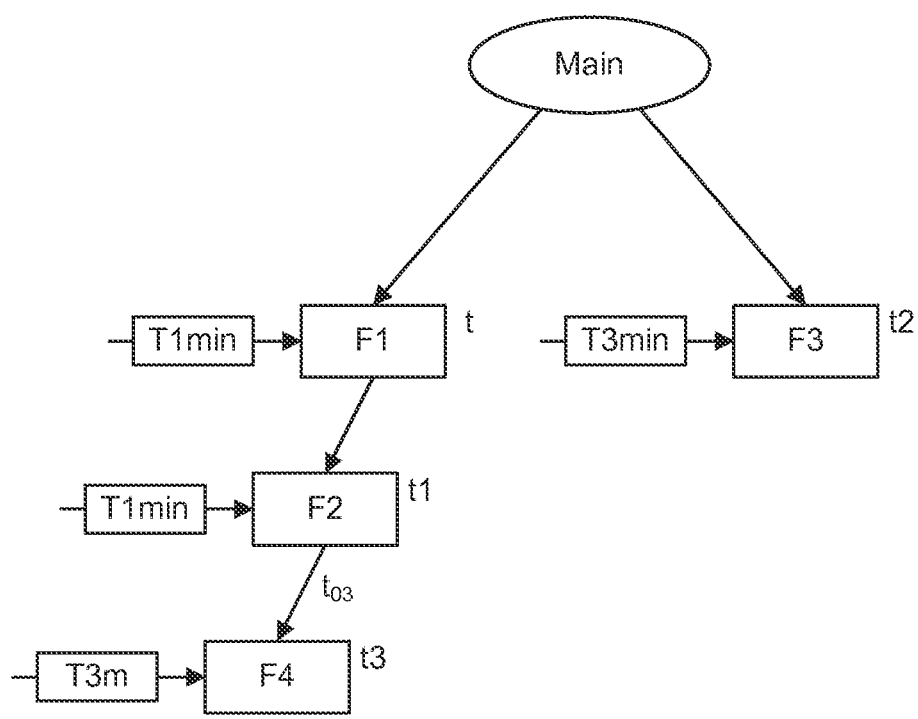
FIG. 2 is a chart illustrating the calling of functions or modules in a sequential computer code program.

Furthermore, the parallelizability of the sequential computer program code is determined, by the analyzer, from the information obtained by analysing and profiling of the sequential computer program code by calling of functions or modules in the sequential computer program code as illustrated in FIG. 2. Then the SPI are inserted to the sequential computer program code by the code generator upon determination of parallelizability to obtain parallel executable computer program code and the parallel computer program code is passed to the parallel computing environment for execution. In an alternative method, sequential computer program codes can be parallelized by segregating into clusters depending on their cluster index. The cluster index is derived from a plurality of parameters including data dependency, chronology of execution according to original code and chronometry of execution.

In one exemplary embodiment, profiling includes plotting call 3-D graphs of variable vs time for determining time required for execution or definition and updating of data variables in the sequential computer program code. To render this graph, the sequential computer program code is executed at least one time offline and the value of the variables and associated time for updating. Another graph which is rendered is variable vs line number graph which checks variable dependency based on the line number of the sequential computer program code. In addition, the analysis phase also includes a function vs time graph which gives a representation of the time taken by individual function. It is noted that through this analysis, critical target functions for parallelization is determined. The functions or modules which take most of the time are best suitable for parallelization. Further, the information obtained is stored in the memory of the automatic parallelization system such as a shared memory for subsequent retrieval.

The objective of preparing call graph and inserting SPI is to achieve initiation of execution of the computer program code ahead of its actual time for initiation of execution in accordance with the execution pattern of original sequential computer program code. Another preferred embodiment includes running redundant computer program codes if required (such as but not limited to if-else and switch-case statements). These results in jumping of execution of non-sequential program codes ahead of their sequential execution times (SETs) based on analysis of data dependencies and records of statistics of updation of data variables. These further results in automatically finding dependency and timing information to identify and analyse timing of modules for parallelization get potential code for parallel execution.

In addition, the call graphs, as determined during the profiling of input sequential code illustrate graphically the fact that all functions or modules follow a definite "call order", wherein the sequence is decided on the portion of the program logic contained within the computer program code and the dependency as in requirement of data variables updated via execution of earlier functions or modules. The call chart is thus drawn by analysing this dependency of data variables and process flow of the program logic. The call graph illustrates graphically the sequence in which different modules are executed in the actual time-scale of execution of the subject sequential code. The objective of determining the call chart is to determine the minimum times required for initiating execution of individual modules within the sequential computer program code. Further, once the modified code is generated, it can be operationally adapted to non-sequential execution in a parallel computing environment.

In another embodiment, an absolute minimum wait time (AMWT) for execution of computer program is determined, by critically assessing nature of computer program codes as well as data dependency statistics. This requires input sequential computer source code to be executed at least once and data profiling is done each time to identify progressive decrements in time required for initiation of execution of downstream computer program codes. This iterative methodology for chronometric assessments leads to determination of a minimum time prior to which it is impossible to initiate execution of downstream computer program codes.

In another embodiment, determining the critical coordinates of time and line number within the sequential computer program code where after the value of a particular data variable does not change is instrumental in deciding the 'ahead of time' execution of the downstream functions or modules is described. Accordingly, the steady state values of data variables at their respective critical points are stored in memory and recalled there from upon requirement by downstream modules. This enables evolution of logic for discrete execution of modules coded for sequential execution.

In one exemplary embodiment, the iterative process to determine true dead times or true earliest times whereupon the corresponding functions may taken up for execution. Thus, the present invention describes an iterative way of determining the true dead times of individual functions. Accordingly, by superimposing the call graph with identified time required for the execution to determine dead times of each functions of the sequential computer program code.

Figure 3:
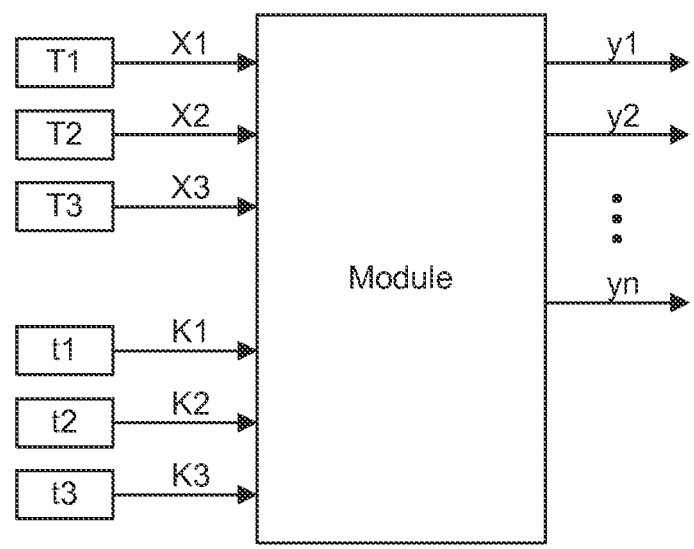
FIG. 3 is a graph illustrating ahead of time logic of execution as per the FIG. 3 preferred embodiment of the present invention.

For example: consider each function or module in the code synonymous to a chip with input and output channels as shown in FIG. 3. Similarly, each function will have input arguments and some output arguments. Suppose X1 X2 and X3, K1, K2 and K3 are the variables which are input to the function and output of the function is y1, y2 . . . yn. Then, yi will be input to some other function and can be dealt in a similar way to this function. These arguments and variables used by the functions are identified. These variables will be observed during several executions of the applications in the "learn mode". Depending on these observations, the part of the function or module code ahead of time is executed. The same scenario is true for coarse parallelism where we consider a call-graph for the application. Each function calls some other function(s). From this graph and the profiling information, the whole dependant function ahead of time of separate cores or part of function codes on separate cores can be executed. The steps involved are drawing a graph of data dependency, drawing call graph, embedding data dependency graph in the call graph, executing the program to find out Ti's where Ti is the time since the variable had reached steady state prior to the function call and finding minima for all Ti's for given function.

F1 is called at time t1's sequential processing.

F1 can be executed at time $(t-T_{1min})$

F2 is called at time t1

=(t+time required for F1 to call F2) in Sequential Processing

However, F2 can be executed at $(t1-T_{2min})=t2$

F2 can be executed on different processor. Once t2 is reached, available processor is found and F2 is executed. It is to be noted that the scheduler will find the processor availability.

Accordingly, the present invention also determines the optimal number of processors required for optimal parallelization of the sequential computer program code. Such an exercise involves scheduling of each task or part thereof on different processors, thus indicating savings in pecuniary and chronometric terms.

In practical cases, we may not have N number of processors to execute computer program code in parallel. For instance, if only four processors are present:
  First is master=processor number 0
  Second is executing F1=processor number 1
  Third is executing F2=processor number 2
  Fourth is executing F3=processor number 3

If another function F4 is ready to be executed and no processor is available, then Dead Time ($T_{dead}$) is calculated. Each function will have its own index=number of parallelization code index sections in the function. Index is also dependent on the execution time of each function in the neighbourhood of the function in the call graph.

For example function F1, F2 and F3 takes $\alpha 1$, $\alpha 2$, $\alpha 3$ time for execution respectively. If we have F4 ready for execution, however core 1, 2, 3 are busy executing F1, F2, F3. Now F4 has to wait for minimum of $\alpha 1$, $\alpha 2$, $\alpha 3$ for getting core available to execute F4 on F1, F2, and F3 respectively. This $\alpha_{min}$ becomes dead time.

One of the solutions for above situation is to find exclusive time of execution for F1, F2, F3, and F4 and find the maximum execution time. Suppose F4 is taking maximum time to execute F1+F2+F3 or any combination of F1/F2/F3 has to execute simultaneously.

In furtherance to the elaborations outlined in the detailed description, reference is now made to some examples the purpose of which is only to explain the practical application of the present invention. Those skilled the art shall appreciate that the examples illustrated are in no way exhaustive and do not limit the scope of the present invention.

Example 1

Execution of Code Ahead of Time According to its Sequential Coding

Upon analysis of code for data dependencies, the line number may be determined where ahead of time execution can be started. Structures like the following may be defined:
  Execute_on_priority_currentprocess_linestart_lineend_wait_linenumberEnd_nextprocess Supposing that line number 100 is currently being executed and that line number 350 to 380 has to start execution, of which is a loop and does not depend upon line numbers from 101 to 349.
  So the construct will be
  execute_on_priority_P2_350_380_wait_349_P1
  Where P1 is the current process from where jumping is to the second process P2 (FOR loop in this case)

Example 2

Parallelization Strategy for if-Else Statement

Whenever any if-else statement. is found, the code is analyzed to find the variable dependency before the actual execution, which means that the line number or location after which variables used inside the if-else statement is not being updated. In many cases it is possible that the variables used inside the if and else blocks are updated for the last time well before the actual if and else starts. But the condition check which decides the actual execution of if-else is not ready with latest variable. In the present invention, if and else both are executed and when the condition statement is ready, then the result of either if or else is selected based on the result of condition statement. In the code segment given below, if-else dependency ends at line number 5, so from line number 6 execution of if and else can start. Since if_cond will be known only after line number 7, so one of the core will start execution of if part (line 9) and other will start execution of else part (line 11). The main core will keep on executing line 6-7. As soon as the line 7 is executed and value of if_cond is known, results from the relevant core is taken and other result is discarded.

| | | |
|---|---|---|
| 1. | module main start | |
| 2. | variables | if_var, else_var,a,b, if_cond |
| 3. | if_var = prime( ) | |
| 4. | else_var_prime1( ) | |
| 5. | comment: No dependency after this line | |
| 6. | Factorial(a,b) | |
| 7. | If_cond = mod3( ) | |
| 8. | If(if_cond) then | |
| 9. | comment: if_var used here | |
| 10. | else | |
| 11. | comment: else_var used here | |
| 12. | end if | |
| 13. | module main end | |

Example 3

Parallelization Strategy for Switch Case Statement

Similar strategy is used for switch case statements. The place where the dependency of the switch case statement ends, execution of different cases can be scheduled to different cores. As soon as the condition variable for case statement is known relevant result can be retained and other results should be discarded.

In summary, the method of parallelization of control flow statements in the sequential computer program code such as but not limitation to if-else, switch-case statements, includes steps of identifying data variables in the control flow statements; identifying the line numbers and time within the control flow statement, wherein said data variables were last updated; storing the identified line numbers in an electronic repository; using the stored data to plot a graph illustrating line and time dependency for updating of said data variables; using the line and time dependency statistics to identify and route whole function or parts thereof to different processors to achieve parallelization of sequential computer program code; and using variable name or address to call from said memory upon due request by processor to result in internal parallelization of said control statement.

Example 4

Parallelization Strategy for Loops

For executing loops ahead of time, the dependency of the variables used in the loop ends is checked and then the whole loop is executed on a separate processor core while the main core still executes the current code. For example, if a loop uses a variable at line number 100 and the variables is last updated on line number 30 then it is possible to execute the loop ahead of time from line number 31 onwards. Thus, line numbers 31 to 99 will be executed on one processor concurrently with the loop starting on line 100 on another processor.

In summary, the method of parallelization of loops in the sequential computer program code comprises the steps of identifying data variables inside the loop statement; checking dependency of the statements; identifying the line numbers within the sequential computer program code wherein said data variables were last updated; storing the identified line numbers in a memory; using the stored data to plot a graph illustrating line-dependency of updating of said data variables; and using the line-dependency statistics to identity and route particular segment of code to different processors to achieve parallelization of sequential computer program code.

Example 5

Iterative Process

Suppose for module F3 as described in one of the above mentioned example, $T_{3min}$ is time period for execution of F3 during which there is no variable dependency. Now once module F1 and module F2 are scheduled based on processor and availability, $T_{3min}$ Changes to $T_{3min}'$ Where $T_{3min}' < T_{3min}$ This initiates the need of second iteration and calculation of $T_{1min}' T_{2min}' T_{3min}'$ and so on. This will go on to N iteration and it will stop when all timing becomes dead time.

Example 6

Pseudo Code for Demonstrating Program Codes

Figure 4:
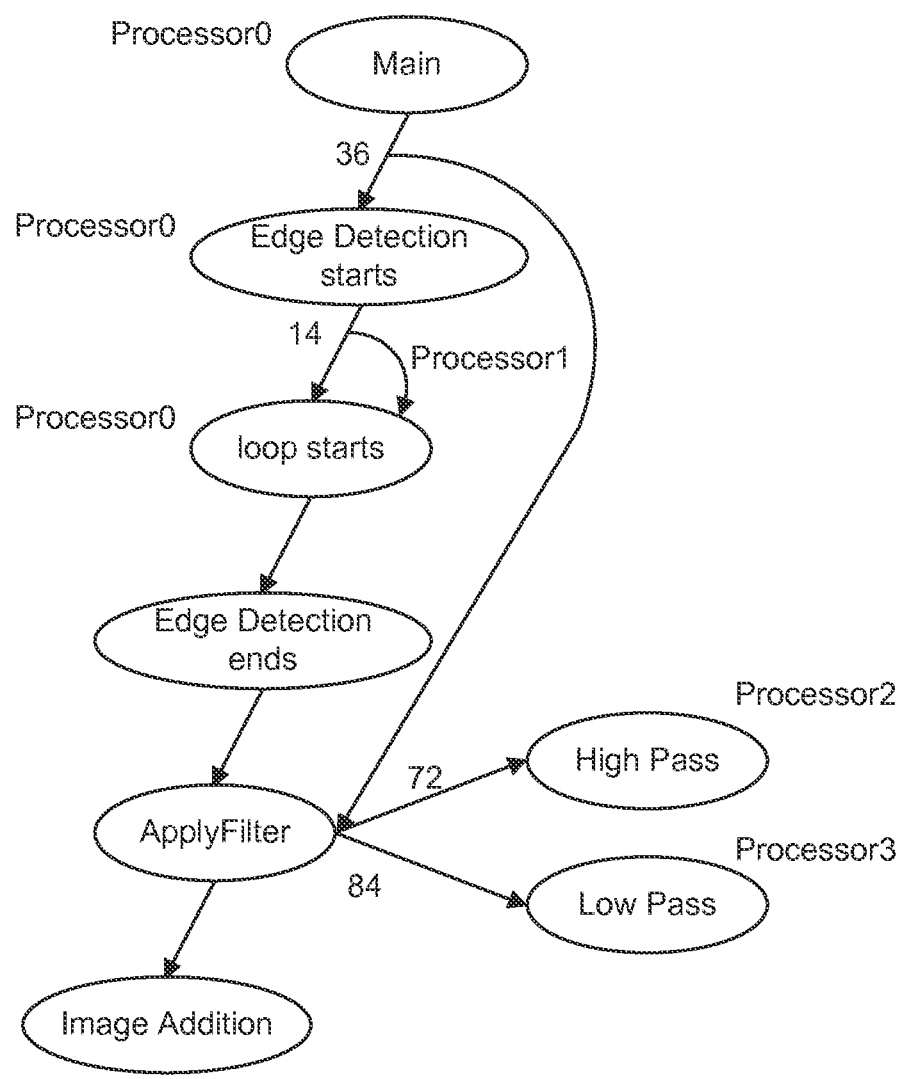
FIG. 4 illustrates an analogy of a chip with input and output to explain the functions or modules in a typical computer program.

The pseudo code example given below is an example code for edge detection algorithm using mask as described in FIG. 4. The expected run-ahead execution based is explained below the example. It is to be noted that the below example may not be the complete example since multiple variables have not been considered.

```
1.   module main start
2.   datastructs                originalImage, edgeImage, filterImage
3.   variables                  X, Y, I, J, sumX, nColors, p, q, vectorSize
4.   variables                  fileSize, mask, row, col, origcols, origrows
5.   variables                  coeffhighpass, coefflowpass, Filttype, sum
6.   q = '0'
7.   mask = (-1, 0, 1, -2, 0, 2, -1, 0, 1)
8.   bmpInput = fileopen(mode, "in")
9.   bmpOutput = fileopen(mode, "out")
10.  fileSize = getImageInfo( )
11.  originalImage.cols = getImageInfo( )
12.  originalImage.rows = getImageInfo( )
13.  edgeImage.rows = originalImage.rows
14.  edgeImage.cols = originalImage.cols
15.  loop from row=0 to row<=originalImage.rows-1
16.      loop from col=0 to col<=originalImage.cols -1
17.          pchar = read each pixel from bmpInput
18.          originalImage.data = pChar
19.      end loop
20.  end loop
21.  nColors = getImageInfo( )
22.  vectorSize = fileSize - (14+40+4*nColors)
23.  copyImageInfo(bmpInput, bmpOutput)
24.  loop from Y=0 to Y<=originalImage.rows-1
25.      loop from X=0 to X<=originalImage.cols-1
26.          sumX = 0
27.          loop from I=-1 to I<=1
28.              loop from J=-1 to J<=1
29.                  sumX = sumX + originalImage.data + X + 1 +
30.                      (Y + J)*originalImage.cols))*mask[I+1][J+1]
31.              end loop
32.          end loop
33.          ifsumX>255 then
34.              sumX=255
35.              Filttype = low
36.          endif
37.          if sumX<0 then
38.              sumX=0
39.              Filttype = high
40.          endif
41.          edgeImage.data + X + Y*originalImage.cols = 255 - sumX
42.      end loop
43.  end loop
44.  if (Filetpe = low) then
45.      filterImage = ApplyHighPassFilter(originalImage)
46.  Else
47.      filterImage = ApplyLowPassFilter(originalImage)
48.  endif
49.  loop from Y=0 to Y<=originalImage.rows-1
50.    loop from X=0 to X<=originalImage.cols-1
51.        resultImage.data = filterImage.data + EdgeImage.data
52.    endloop
53.  endloop
54.  module main ends
```

```
55.   funciton getImageInfo start
56.   variables              numberOfChars, value, dummy, i
57.   dummy = '0'
58.   loop from i=1 to i<=numberOfChars
59.       value = read value from file
60.   end loop
61.   module getImageInfo end
62.   module copyImageInfo
63.   variables              numberOfChars, value, dummy, i
64.   dummy = '0'
65.   loop from i=0 to i<=50
66.       value = read value from file
67.       bmpOutput = write 'value'
68.   end loop
69.   module copyImageInfo end
70.   module ApplyHighPassFilter
71.   loop from ht = 0 to row
72.       loop from wd = 0 to col
73.           sum = 0
74.           loop from c = 0 to coeffhighpass
75.               sum = sum + coeffhighpass * originalImage.data
76.           end loop
77.           filterImage.data = sum
78.       end loop
79.   end loop
80.   function ApplyHighPassFilter end
81.   module ApplyLowPassFilter
82.   loop from ht = 0 to row
83.       loop from wd = 0 to col
84.           sum = 0
85.           loop from c = 0 to coefflowpass
86.               sum = sum + coefflowpass * originalImage.data
87.           end loop
88.           filterImage.data = sum
89.       end loop
90.   end loop
91.   function ApplyLowPassFilter end
```

Ahead of time execution:

If the variable 'original Image rows' is considered, then by analyzing the above code, the variable gets updated at line number 12 after which it is being used at 13, 15, 24 and 50. The loop at line number 24, none of the variables used in this loop use any of the variables being updated from line 13 to 23. Hence, while the above code is executing lines 13 to 23, loop at line number 24 to 32 is executed in parallel on another processor. Therefore, starting the execution of loop at line number 25 to 31 is ahead of time.

The present invention is more easily comprehended by reference to the specific embodiments, examples and drawings recited hereinabove which are representative of the invention. It must be understood, however, that the same are provided for the purpose of illustration, and that the invention may be practiced otherwise than as specifically illustrated without departing from its spirit and scope. As will be realized, the present invention is capable of various other embodiments and that its several components and related details are capable of various alterations, all without departing from the basic concept of the present invention. Accordingly, descriptions will be regarded as illustrative in nature and not as restrictive in any form whatsoever. Modifications and variations of the system and apparatus described herein will be obvious to those skilled in the art. Such modifications and variations are intended to come within the scope of the appended claims.

We claim:

1. A method for parallelization of sequential computer program code, the method comprising:
    determining line dependency data indicating a dependency of a plurality of lines of the sequential computer program code, wherein the dependency of the plurality of lines of the sequential computer program code includes a line number and an update time when a data variable is last updated;
    determining time data indicating a time required for the execution of a plurality of functions of the sequential computer program code;
    determining parallelizability of the sequential computer program code using the line dependency data and the time data; and
    generating parallel executable computer program code by inserting program instructions in the sequential computer program code based on the determined parallelizability, the program instructions being configured to change a time at which a portion of the sequential computer program code is executed based on the update time;
    wherein the step of generating the parallel executable computer program code comprises identifying and routing at least a portion of one or more of the plurality of functions to different processors to achieve parallelization of sequential computer program code using the line data and time dependency data.

2. The method of claim 1, further comprising analyzing a structure of the sequential computer program code using an automatic parallelization system to determine the dependency of each of the plurality of lines and the time required for execution of each of the plurality of functions.

3. The method of claim 2, wherein the step of analyzing the structure comprises analyzing the structure offline before execution of the sequential computer program code.

4. The method of claim 1, further comprising generating call 3D graph data based on the structure of the sequential computer program code, the line dependency data, and the time data, wherein the step of determining parallelizability of the sequential computer program code uses the line dependency data and the time data comprising determining the parallelizability using the call 3D graph data.

5. The method of claim 4, wherein the call 3D graph data comprises a first graph based on a variable and a time, a second graph based on the variable and a line number, and a third graph based on a function and the time for the sequential computer program code.

6. The method of claim 1, further comprising determining dead times of each of the plurality of functions of the sequential computer program code.

7. The method of claim 1, further comprising estimating absolute minimum wait time (AMWT) for initiating execution of a particular function within the sequential computer program code.

8. The method of claim 1, wherein the sequential computer program code further comprises control flow statements and loop statements.

9. The method of claim 8, wherein, for the control flow statements, generating the parallel executable program code comprises:
identifying data variables in the control flow statements;
identifying line numbers and execution times within the control flow statements when the data variables were last updated;
storing the identified line numbers in a memory for subsequent retrieval;
plotting a 3D graph illustrating line and time dependency for updating the data variables using the stored data; and
using a variable name or an address to call from the memory upon a request by a processor to result in internal parallelization of the control flow statements.

10. The method of claim 8, wherein, for the loop statements, generating the parallel executable program code comprises:
identifying data variables inside the loop statements;
checking dependency of the loop statements;
identifying line numbers within the sequential computer program code where the data variables were last updated;
storing the identified line numbers within the line dependency data in a memory;
plotting a 3D graph illustrating line dependency of updating of the data variables using the stored data; and
routing particular segments of code to different processors to achieve parallelization of sequential computer program code using the line dependency data.

11. The method of claim 1, further comprising segregating the sequential computer program code into clusters depending on a cluster index.

12. The method of claim 11, wherein the cluster index is derived from a plurality of parameters including data dependency, chronology of execution according to original code, and chronometry of execution.

13. An automatic parallelization system for parallelization of sequential computer program code comprising:
a profiler configured to determine line dependency data indicating a dependency of a plurality of lines of the sequential computer program code and time data indicating a time required for the execution of a plurality of functions of the sequential computer program code, wherein the dependency of the plurality of lines of the sequential computer program code includes a line number and an update time when a data variable is last updated;
an analyzer configured to determine parallelizability of the sequential computer program code based on the line dependency data and the time data;
a code generator configured to generate parallel computer program code by inserting program instructions in the sequential computer program code based on the determined parallelizability, the program instructions being configured to change a time at which a portion of the sequential computer program code is executed based on the update time; and
a plurality of processors for executing the parallel computer program code;
wherein at least one of the analyzer or the code generator is configured to identify and route at least a portion of one or more of the plurality of functions to different processors to achieve parallelization of sequential computer program code using the line data and time dependency data.

14. The system of claim 13, further comprising a syntactic analyzer configured to analyze a structure of the sequential computer program code offline and before execution of the sequential computer program code.

15. The system of claim 14, further comprising a memory configured to store data generated by at least one of the syntactic analyzer or the profiler for later retrieval.

16. The system of claim 13, wherein the profiler is further configured to generate call 3D graph data based on the structure of the sequential computer program code, the line dependency data, and the time data, and wherein the analyzer is configured to determine the parallelizability of the sequential computer program code using the call 3D graph data.

17. The system of claim 16, wherein the call 3D graph data comprises a first graph based on a variable and a time, a second graph based on the variable and a line number, and a third graph based on a function and the time for the sequential computer program code.

18. The system of claim 13, wherein the sequential computer program code comprises control flow statements, and wherein at least one of the analyzer or the code generator is further configured to:
identify data variables in the control flow statements;
identify line numbers and execution times within the control flow statements when the data variables were last updated;
store the identified line numbers in a memory for subsequent retrieval;
plot a 3D graph illustrating line and time dependency for updating the data variables using the stored data; and
use a variable name or an address to call from a memory upon a request by a processor to result in internal parallelization of the control flow statements.

19. The system of claim 13, wherein the sequential computer program code comprises loop statements, and wherein at least one of the analyzer or the code generator is further configured to:
identify data variables inside the loop statements;
check dependency of the loop statements;
identify line numbers within the sequential computer program code where the data variables were last updated;
store the identified line numbers in a memory;
plot a 3D graph illustrating line dependency of updating of the data variables using the stored data; and
route particular segments of code to different processors to achieve parallelization of sequential computer program code using the line dependency data.

20. A system for parallelization of sequential computer program code, the system comprising:
  at least one processor operably coupled to at least one memory and configured to:
    determine line dependency data indicating a dependency of a plurality of lines of the sequential computer program code, wherein the dependency of the plurality of lines of the sequential computer program code includes a line number and an update time when a data variable is last updated;
    determine time data indicating a time required for the execution of a plurality of functions of the sequential computer program code;
    generate call 3D graph data based on a structure of the sequential computer program code, the line dependency data, and the time data;
    determine parallelizability of the sequential computer program code using the information in the call 3D graph data; and
    generate parallel executable computer program code by inserting program instructions in the sequential computer program code based on the determined parallelizability;
    wherein the at least one processor is configured to generate the parallel executable computer program code by identifying and routing at least a portion of one or more of the plurality of functions to different processors to achieve parallelization of sequential computer program code using the line data and time dependency data.

* * * * *